United States Patent [19]

Oide et al.

[11] 4,298,121
[45] Nov. 3, 1981

[54] CONNECTED TEMPORARY FASTENING NAILS FOR USE IN THE ADHESIVE INSTALLATION OF ORNAMENTAL PLYWOOD

[75] Inventors: Kunimasa Oide, Kawanishi; Hideo Ishii, Okayama, both of Japan

[73] Assignee: Daichiku Company, Limited, Hyogo, Japan

[21] Appl. No.: 176,531

[22] Filed: Aug. 8, 1980

[51] Int. Cl.³ .................. B65D 83/02; B65D 85/24; B65D 85/62; F16B 13/06
[52] U.S. Cl. ........................... 206/347; 206/820; 206/343; 411/480; 411/544; 411/546
[58] Field of Search ............ 206/347, 343, 341, 820; 411/480, 481, 439, 544, 545, 546, 547

[56] References Cited

U.S. PATENT DOCUMENTS

| | | | |
|---|---|---|---|
| 975,310 | 11/1910 | De Ybarrondo | 411/546 |
| 2,127,665 | 8/1938 | Leslie | 206/341 |
| 2,171,877 | 9/1939 | Johnson | 411/546 |
| 3,202,270 | 8/1965 | Schory et al. | 206/820 |
| 3,349,899 | 10/1967 | Powers | 206/347 |
| 3,693,220 | 9/1972 | Pabich et al. | 206/343 |
| 4,106,618 | 8/1978 | Haytayan | 206/347 |

Primary Examiner—William T. Dixson, Jr.
Attorney, Agent, or Firm—Koda and Androlia

[57] ABSTRACT

Connected temporary fastening nails including vertically oriented connecting parts formed by making cuts at fixed intervals along the length of a continuous elastic part which is substantially square in cross-section and which has a hollow space in the interior of the continuous elastic part and a plurality of small diameter nails each provided through adjacent connecting parts at fixed intervals along the length of the continuous elastic part.

9 Claims, 10 Drawing Figures

CONNECTED TEMPORARY FASTENING NAILS FOR USE IN THE ADHESIVE INSTALLATION OF ORNAMENTAL PLYWOOD

BACKGROUND OF THE INVENTION

1. Field of Invention

This invention relates to fastening nails and more particularly to fastening nails utilized to temporarily fasten various types of boards on walls, ceilings, etc. while the board being installed utilizing adhesive.

2. Prior Art

Conventional temporary fastening nails consist of individual nails, each of which is formed by anchoring a relatively small diameter nail in an elastic part made of plastic. Such temporary fastening nails have been developed by the present inventor and are described in Japanese Pat. No. 870627, Japanese Pat. No. 898340, Australian Pat. No. 454475, West German Pat. No. 2313615 and Canadian Pat. No. 998265.

Before the above-described conventional temporary fastening nails were developed, the installation of various types of boards on walls and ceilings was performed as follows: After the back surface of the board to be installed had been coated with an adhesive, the board was supported from below by means of support posts, etc., or was nailed in place with ordinary nails. The adhesive was allowed to set and the support posts or nails were removed. Such methods suffered from several drawbacks. First, when support posts were used the assembly and removal of the support posts required the expenditure of time and effort. On the other hand, when nails were used for temporarily fastening and then removed, the board was damaged by the nailing, the nails were difficult to remove and the nail holes that remained after the nails had been removed were conspicious. The above-described conventional temporary fastening nails, which were developed by the present inventor, eliminated some of the above-mentioned drawbacks.

These temporary fastening nails developed by the Inventor were used as follows: After the back surface of the board to be installed had been coated with an adhesive the board was placed against the surface on which it was to be installed and a large number of temporary nails were lightly driven in with a hammer one nail at a time so that the elastic parts attached to the nails supported the board with an appropriate pressing force. After the adhesive had set, the elastic parts attached to the nails were grasped and the nails were pulled out. In this case, the nails could easily be pulled out and the nail holes remained after the nails had been removed were not large enough to be conspicious. Since these temporary fastening nails possesed the above-described advantages, they greatly facilitated the installation of various types of boards on walls and ceilings.

However, the design of the above-described conventional temporary fastening nails made it impossible to drive a large number of nails in a continuous process using a machine such as a nail gun. Thus, there was a demand for temporary fastening nails designed so that they could be driven in with a a nail gun. Moreover, the inventor of the conventional temporary fastening nail recognized that connected temporary fastening nails would also facilitate the nail-driving process where the nails were driven by hand.

SUMMARY OF THE INVENTION

Accordingly, it is the general object of the present invention to provide connected temporary fastening nails which have elastic portions that are specially designed so that the temporary fastening nails can be driven with a nail gun without sacrificing the advantages of conventional temporary fastening nails.

It is yet another object of the present invention to provide connected temporary fastening nails designed so that a large number of nails can be easily held in one hand when the temporary fastening nails are driven by hand with the nails being separated one at a time as they are being used.

In keeping with the principles of the present invention, the objects are accomplished by an unique connected temporary fastening nails which include vertically oriented connecting parts formed by making cuts at predetermined intervals along the length of a continuous elastic part which is roughly square in cross-section and which has a hollow space in its interior and small diameter nails provided through adjacent connecting parts at fixed intervals along the length of the continuous elastic part. Since these connected temporary fastening means are designed as described above, nails can be driven into a board in a continuous process using a nail gun in which the nails are separated one at a time as they are used. Furthermore, after the individual temporary fastening nails have been driven in, the elastic parts attached to the nails support the board with an appropriate pressing force and after the adhesive has set, the nails can easily be removed. As a result, this invention makes it possible to mechanize board installation and therefore has a great labor saving effect.

BRIEF DESCRIPTION OF THE DRAWINGS

The above-mentioned feature and objects of the present invention will become more apparent with reference to the following description taken in conjunction with the accompanying drawings wherein like reference numerals denote like elements, and in which.

DETAILED DESCRIPTION OF THE INVENTION

Figure 1:
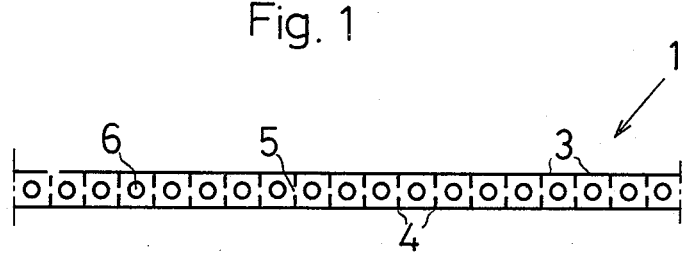
FIG. 1 is a plan view of connected temporary fastening nails according to the teachings of the present invention.
Figure 2:
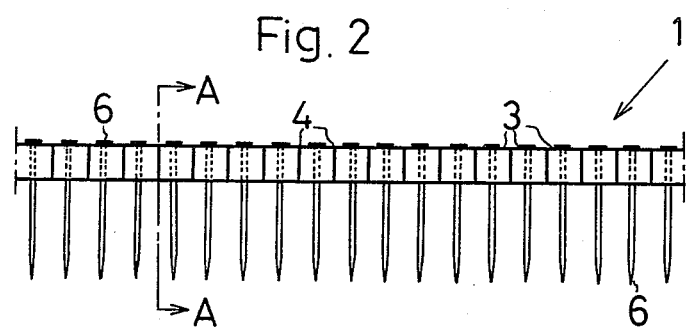
FIG. 2 is a side view of connected temporary fastening nails in accordance with the teachings of the present invention.

Referring more particularly to the drawings, shown in FIGS. 1 and 2 are a plan and a side view of one embodiment of connected temporary fastening nails in accordance with the teachings of the present invention.

Figure 3:
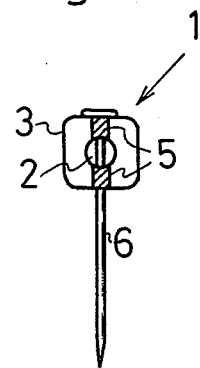
FIG. 3 is a magnified cross-section along the line A—A in FIG. 2.

FIG. 3 is a magnified cross-section along line A—A in FIG. 2. As is clear from the drawings, the connected temporary fastening nails provided by this invention are made up of vertically oriented connecting parts 5 which are formed by making cuts 4 at predetermined intervals along the length of a continuous elastic part 3 which is substantially square in cross-section and which has a hollow space 2 formed in its interior. Small diameter nails 6 are provided through adjacent connecting parts 5 at fixed intervals along the length of the continuous elastic part 3.

Accordingly, the present invention has three special features. First, the nails 6 are connected by the connecting part 5. Second, the connecting parts 5 are located near the center of the elastic part 3 and are vertically oriented with respect to the elastic part 3, i.e. are oriented parallel to the lengths of the nails 6. Thirdly, a hollow space 2 which runs longitudinally down the entire length of the connected temporary fastening nails is formed inside the elastic part 3.

Figure 9:
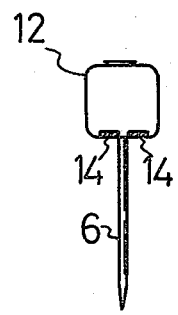
FIG. 9 is a cross-section corresponding to FIG. 3 which illustrates an example for the purposes of comparison in which the connecting parts are located at the bottom of the elastic part.

The design of the connecting parts 5 is important to the present invention. For example, if connecting parts 14 are formed perpendicular to the lengths of the nails 6 as shown in FIG. 9, the ends of the block of connected temporary fastening nails which are secured by a multiple number of elastic parts 12 connected to each other will sag downward since connecting parts 14 are located only at the lower end of each of elastic part 12. As a result, it is difficult to load the connected temporary fastening nails into a nail gun. Furthermore, the stability of the nails during the driving process is poor, and it is difficult to drive the nails through. On the other hand, if the connected parts 5 are formed parallel to the nail 6 (specifically, if connecting parts 5 are formed so that they are vertically oriented along and below the hollow space 2) the connected temporary fastening nails will not bend upward or downward. As a result, the nails can be easily loaded into a nail gun and can be stably driven.

In the following paragraph, a nail gun which uses a connected temporary fastening nails provided by this invention, is disclosed and the reason for forming a hollow space 2 inside the connecting temporary fastening nails is explained.

Figure 10:
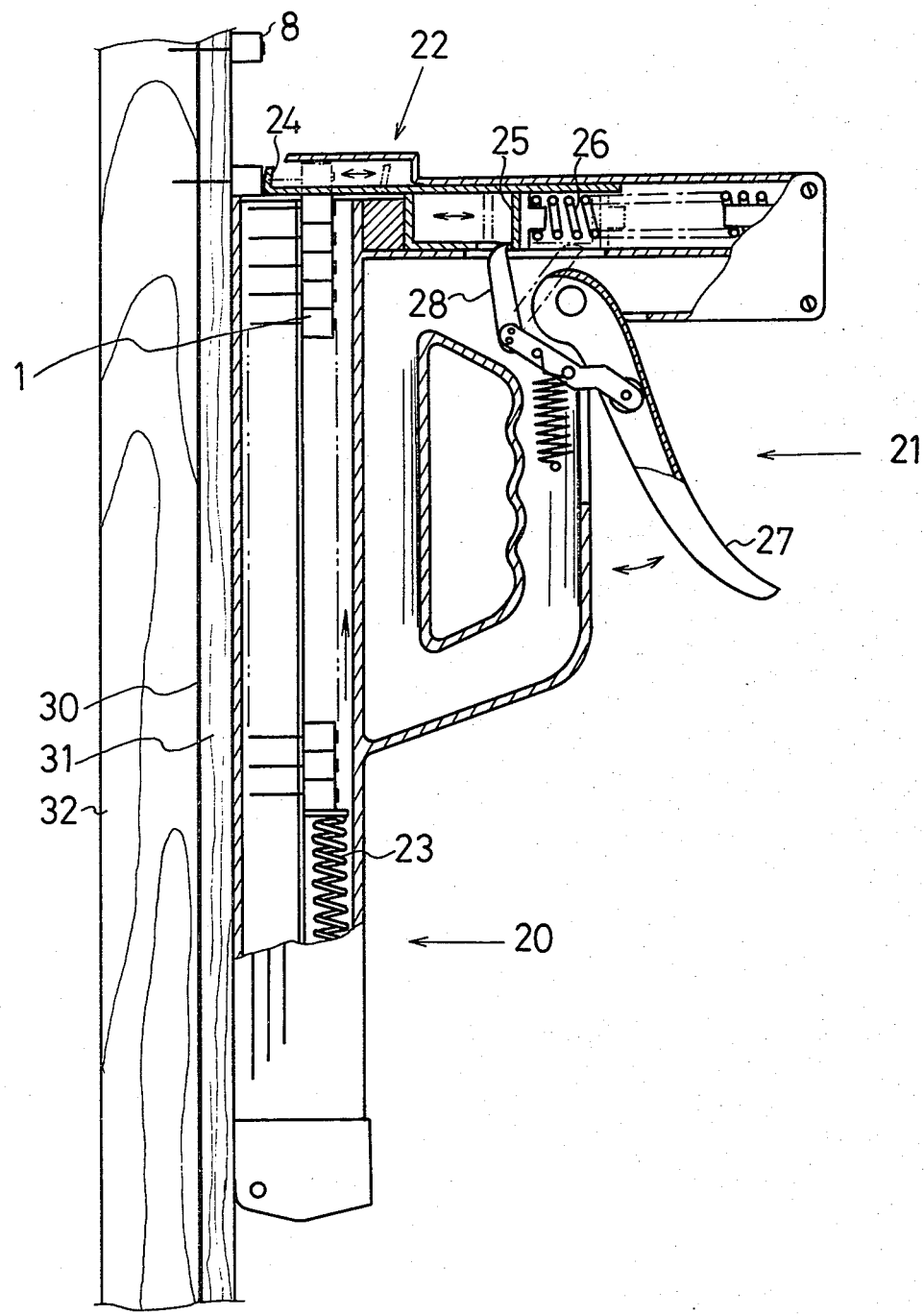
FIG. 10 is a partially cut-away front view of a nail gun which is shown driving connected temporary fastening nails in accordance with the teachings of the present invention, to facilitate installation of ornamental plywood on a wall.

Ordinarily, a large number of temporary fastening nails must be driven one at a time. Moreover, in cases where ceiling panels are being installed, the worker must ordinarily face upward while driving in the temporary fastening nails, so that the work is quite laborious. Accordingly, a light, simple nail is demanded for such work. Furthermore, the connected temporary fastening nails used in such a gun must be suited to the performance of the nail gun. The nail gun shown in FIG. 10 consists principally of a magazine part 20, an operating part 21 and a nail driving part 22. The connected temporary fastening nails 1 provided by the present invention are loaded into the magazine part 20 and are pushed toward the nail driving part 22 by a spring 23. The nail driving part 22 consists of a hammer which breaks nails off one at a time at the connecting parts 5 from the connected temporary fastening nails 1 and drives the nails, a hammer box 25 which is connected to the hammer 24 and a nail driving spring 26 which exerts spring force on the hammer box 25. When the handle 27 of the operating part 21 is pushed toward the magazine part 20, a box catch pawl 28 which moves along with the handle 27 catches the hammer box 25 and moves the hammer box 25 to the right with respect to FIG. 10 against the force of the nail driving spring 26. At the same time, the hammer 24 connected to the hammer box 25 moves along the hammer box 25. At this time, the pushing force of the spring 23 causes tip of the connected temporary fastening nails 1 to move into the striking plane of the hammer 24. When the handle 27 is pushed even further, the box catch pawl 28 moves away from the hammer box 25. As a result, the spring force of the nail driving spring 26 causes the hammer box 25 and the hammer 24 to move instantaneously to the left with respect to FIG. 10. With each stroke of the hammer 24, a sharpened cutter formed on the tip of the hammer 24 breaks off a single temporary fastening nail 8 from the block of connected temporary fastening nails 1 and the hammer drives the temporary fastening nail 8 in so that the board 31 whose back surface is coated with a layer of adhesive 30 to be temporarily fastened to the frame 32.

Since the nail gun is designed as described above, the striking force of the hammer 24 used to break off the temporary fastening nails 8 one at a time from the block of connected temporary fastening nails 1 and drive them in depends on the spring force of the nail driving spring 26. As is described above, it is desirable that the nail gun be simple in design. Furthermore, the smaller the gripping force required in order to operate the handle, the less fatigued the worker will be. Accordingly, a nail driving spring 26 with a large spring force cannot be used. As a result, if most of the striking force of the hammer 24 is expended in cutting the connecting parts 5 of the block of connected temporary fastening nails 1, the temporary fastening nail 8 cannot be driven in.

In the present invention, therefore, the lateral width of each connecting part 5 in the connected temporary fastening nails 1 (i.e. the width cut by the cutter on the tip of the hammer 24) is made narrow and a hollow space 2 is formed in the elastic part 3 so that each connecting part 5 is not a continuous part but is instead interrupted by the hollow space 2 at an intermediate point. This formation of a cavity in the elastic part 3 so that each connecting part 5 is interrupted at an intermediate point reduces the required cutting load on the nail gun so that the striking force of the hammer 24 can be effectively utilized in driving the nail 8.

Figure 4:
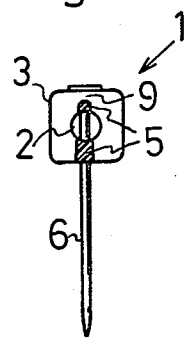
FIGS. 4, 5, 6, 7 and 8 are cross-sections corresponding to the cross-section of FIG. 3 which illustrates other embodiments of the present invention.
Figure 5:
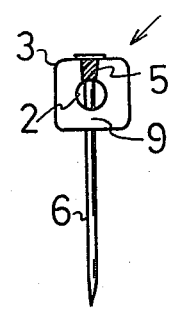

In the embodiments illustrated in FIGS. 3 through 5, the cross-sectional shape of the above-described hollow space 2 is round, i.e. a round hole is formed. However, the purpose of the present invention can be achieved with other cross-sectional shapes, i.e. polygonal, angular, square, as shown in FIG. 6, triangular, as shown in FIGS. 7 and 9 or elliptical, etc.

Figure 6:
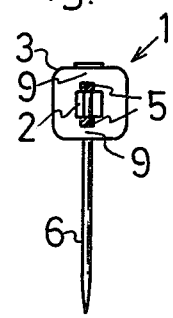
Figure 7:
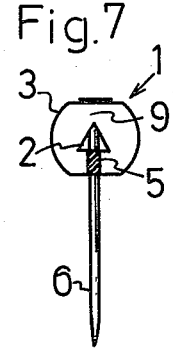

FIGS. 4 through 8 are cross-sections of other embodiments of the connecting parts 5 used in the present invention. In the embodiment shown in FIG. 4, the cross-sectional width of each connecting part 5 decreases in the upward direction and the gap 9 is less than the top of each of the connecting parts 5. Of course, it would also be possible to use a cross-sectional shape which is the reverse of this with respect to the vertical axis. FIG. 5 illustrates an embodiment in which vertically oriented connecting parts 5 are formed only above the hollow space 2 and of course it would also be possible to form the connecting parts 5 only below the hollow space 2. FIG. 6 illustrates an embodiment in which the connecting parts 5 are formed above and below the hollow space 2 and the top and bottom of the elastic part 3. All the above-described connecting parts 5 are vertically oriented and positioned at the lateral center of the elastic part 3. As a result, the cutting load is reduced and the nail is not deflected by the cutting shock when it is driven. Accordingly, all of the above-described embodiments can achieve the purpose of the present invention.

Figure 8:
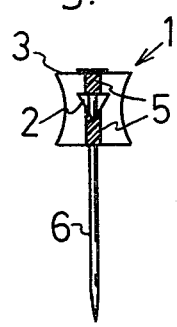

The cross-sectional shape of the above-described elastic part 3 is preferably square, as is shown in FIGS. 3 through 6. However, an elastic part whose sides were cut to bulge outwardly as shown in FIG. 7 or an elastic part whose sides were concave as shown in FIG. 8 would also be convenient in that such an elastic part would be easy to grab and pull out after the adhesive has set and would facilitate removal of the nails by means of a machine.

As for the material utilized for the elastic part 3, rubber or a soft synthetic resin is appropriate. If such materials are used, the elastic part 3 attached to each temporarily fastened nail will not damage the board and the board will be supported by an appropriate pressing force so that good temporary fastening can be achieved.

In the following paragraphs, a method of manufacturing the connected temporary fastening nails in accordance with the teachings of the present invention will be described.

Firstly, a synthetic resin such as polyvinyl chloride is heated and melted, and is then injection molded so that a central cavity is formed. This process produces a hollow plastic rod which is square in cross-section. Next, cuts are made with a cutter at intervals of approximately 5 to 10 mm so that gaps 9 are formed and so that vertically oriented connecting parts 5 are left. During this cutting process nails 6 are provided through the synthetic resin to form connected temporary fastening nails 1. It would also be possible to provide the nails 6 before or after the cutting process.

It should be apparent that the connected temporary fastening nails 1 provided by the present invention are convenient to use temporary fastening nails which can be utilized in cases where the temporary nailing involved in the adhesive installation of ornamental plywood, etc., is performed by hand using a hammer. On the other hand, when a nail gun of the type described above is utilized, loading is facilitated since the connected temporary fastening nails do not bend upward or downward. Furthermore, since the task can be satisfactorily performed even with a small cutting load, striking force of the nail gun expended in cutting is small. Moreover, the nails can be stably driven in to their intended targets. In addition, the formation of a hollow space inside the elastic part 3 increases the elasticity of the elastic part 3. As a result, even if unintended shock is applied, the elastic part will appropriately absorb striking force so that scratches and indentions in the ornamental plywood are prevented. The formation of such a hollow space also results in saving in material costs. Furthermore, when the adhesive is set so that the installation of the ornamental plywood is completed, the temporary fastening nails can be easily pulled out by hand or with a tool.

It should be apparent to those skilled in the art that the above described embodiments are merely illustrative of a few of the many possible specific embodiments which represent the applications and principles of the present invention. Numerous and various other arrangements can be readily devised by those skilled in the art without departing from the spirit and scope of the invention.

We claim:

1. Connected temporary fastening nails comprising:
   an elongate continuous elastic member of substantially square cross-section and having a hollow space formed longitudinally therein;
   a plurality of pairs of opposing cuts formed in opposing sides of said elastic member forming connecting parts transverse of said elastic member, said plurality of pairs of opposing cuts being provided at a predetermined spacing; and
   a plurality of small diameter nails provided through said elastic member at a predetermined interval along the length of said elastic member and parallel to said connecting parts, one each of said nails being provided between two adjacent connecting parts.

2. Connected temporary fastening nails comprising:
   an elongate continuous elastic member of substantially square cross-section and having a hollow space formed longitudinally therein;
   a plurality of connecting parts formed transversely along said elastic member at a predetermined spacing; and
   a plurality of small diameter nails provided with said elastic member at a predetermined interval along the length of said elastic member and parallel to said connecting parts, one each of said nail being provided between two adjacent connecting parts.

3. Connected temporary fastening nails according to claim 1 wherein said elastic part is made from a material selected from a group consisting of rubber and soft synthetic resin.

4. Connected temporary fastening nails according to claim 1 wherein said hollow space is round in cross-section.

5. Connected temporary fastening nails according to claim 1 wherein said hollow space is elliptical in cross-section.

6. Connected temporary fastening nails according to claim 1 wherein said hollow space is angular in cross-section.

7. Connected temporary fastening nails according to claim 1 wherein said connecting parts are formed on both sides of said hollow space.

8. Connected temporary fastening nails according to claim 1 wherein said connecting parts are formed only above said hollow space.

9. Connected temporary fastening nails according to claim 1 wherein said connecting parts are formed only below said hollow space.

* * * * *